United States Patent Office 3,509,120
Patented Apr. 28, 1970

3,509,120
N-TERMINAL MONO- AND DIAMINO-
ACYL-INSULIN
Miklos Bodanszky, Shaker Heights, Ohio, and Asger F. Langlykke, Plainfield, and John T. Sheehan, Middlesex, N.J., assignors to E. R. Squibb & Sons, Inc., New York, N.Y., a corporation of Delaware
No Drawing. Filed Dec. 28, 1966, Ser. No. 605,166
Int. Cl. A61k *17/02;* C07c *103/52;* C07d *99/06*
U.S. Cl. 260—112.7                10 Claims

ABSTRACT OF THE DISCLOSURE

Polypeptides selected from the group consisting of insulins substituted in the N-terminal position with either proline or glycine possessing increased hormonal activity.

---

This invention relates to novel therapeutic compounds. More particularly, this invention relates to new derivatives of insulin; that is, insulin substituted in the N-terminal position with proline or glycine, and therapeutic compositions containing them.

It has been discovered that such proline or glycine substitution results in a product having an increase in the duration of activity of the hormone. The case of this increase is not fully understood although it has been postulated to be the result of a greater resistance afforded by the proline and glycine groups to cleavage by the various enzymes, such as aminopeptidase, present in the body, the action of which result in the more or less rapid digestion of the forms of insulin currently available. Such digestion necessitates relatively frequent injections in order to maintain the required level of insulin in diabetic patients to combat the hyperglycemia associated with that disease.

By reason of the present invention a product is made available which limits the necessity for such frequent injections and thus greatly simplifies the treatment of the disease. The importance of lessening the number of injections required is obvious and well recognized in the art. Aside from the purely convenience aspects, the lessened danger of infection arising from frequent injections, usually administered by the patient himself, clearly reduces the risks involved in such treatment. The development of an insulin form having the prolonged activity described has therefore been the subject of considerable research activity for over 30 years.

Objects of this invention, therefore, are to provide new prolonged-acting insulin forms and parenteral therapeutic compositions containing the same, suitable for the treatment of diabetes-induced hyperglycemia.

Among the suitable insulins of animal origin which may be employed as starting materials in the preparation of products in this invention may be mentioned such as those insulins obtained from the pancreas glands of pigs, cattle, whales, fish and others. Particularly preferred is that insulin obtained from the pancreas glands from pigs commonly known as pork insulin.

The prolyl- and glycyl-substituted insulins of this invention may be prepared by the acylation of such insulins with an active ester such as t-butyloxycarbonyl-L-proline p-nitrophenyl ester, or t-butyloxycarbonyl-glycine p-nitrophenyl ester. If desired, other t-butyloxycarbonyl-L-proline or N-glycine active esters, such as N-hydroxysuccinyl esters, phenyl esters, and substituted phenyl esters, such as negatively substituted phenyl esters, for example thiophenyl esters, nitrophenyl esters, dinitrophenyl esters, nitrophenylthio esters, cyanophenyl esters, halogenated phenyl esters, and the like, may be employed in the acylation step. The above acylation procedure results in the formation of protected prolyl or glycyl-insulin derivatives, the particular derivative obtained depending, as will be seen from the examples, upon the relative amounts of reactants employed.

The t-butyloxycarbonyl protecting group can be removed to obtain the final prolyl- or glycyl-substituted insulin product. The protecting group is preferably removed by treatment with trifluoroacetic acid, although any method known in the art may be employed, such as treatment with a hydrohalic acid (such as hydrobromic or hydrochloric acids) in acetic acid, or other known acid treatments.

Rather than using the prolyl- or glycyl-substituted insulin products of this invention per se in the treatment of diabetics, various complexes and compositions thereof may be employed in order to even further prolong the time of action of these prolyl-insulin derivatives. Thus the prolyl- or glycyl-substituted insulins of this invention may be reacted with a zinc salt such as zinc chloride, preferably in the presence of a buffering agent such as organic acid, (e.g., acetic, succinic and citric acids) and an alkali metal hydroxide whereby a zinc prolyl or glycylinsulin is obtianed; or with a zinc salt as above plus an alkaline protein such as protamine, histone and globin whereby protamine, histone and globin-prolyl or glycyl zinc insulins are obtained. The preparation of such complexes and compositions is well known in the art. In addition, any other method known in the art whereby the isoelectric point of the prolylinsulin is raised to that of the pH of blood may be used.

To prepare parenterally acceptable compositions of this invention incorporating prolyl or glycylinsulin, any of the many well recognized procedures for preparing the known insulin containing compositions may be employed. For instance, the prolyl or glycylinsulin may be dissolved in sterile water at a pH of about 2 to about 4 (preferably about 2.5 to about 3.5). Concentration of the prolyl or glycylinsulin should be such that about 40 units to about 500 units of prolyl or glycylinsulin per ml. of final solution is obtained. Preferably a preservative such as phenol or m-cresol is added to the solution, optimally in a concentration of about 0.05% to about 0.5%. An agent to achieve isotonicity such as glycerin can also be included, optimally in a concentration of about 0.15%.

In use, compositions containing the insulins of this invention are ordinarily administered to diabetics subcutaneously in a dosage of about 0.25 ml. to about 2 ml. (preferably about 1 ml.), thereby affording a dosage of about 20 units to 1,000 units (preferably about 250 units) of prolylinsulin. It is of course understood that in the treatment of diabetes, there is no "standard" dosage and that a particular dosage must in all cases be individualized according to the requirements of the particular individual.

The following examples further illustrate the invention.

EXAMPLE 1 t-Butyloxycarbonyl-L-prolylinsulin

Insulin (pork) from Novo Industrie A/S (1.2 g., 200 μmoles) is dissolved in 20 ml. of a 1:1 pyridine water mixture and to this solution is added a solution of t-butyloxycarbonyl-L-proline p-nitrophenyl ester in pyridine (0.2 g., 600 μmoles/2 ml.). The reaction mixture is stirred at room temperature at constant pH (8.5) under pH stat control. The reaction mixture consumes 2.5 equivalents of base (0.25 N NaOH) over a period of 2 hours, after which no further aoction occurs. The mixture is brought to pH 5.5 with 2 ml. 6 N hydrochloric acid and concentrated to dryness in vacuo at room temperature. The residue, an oil is dissolved in 20 ml. of water which is adjusted to pH 5.5 and again taken to dryness in vacuo. The residue is suspended in 50 ml. of ethanol and the colloidal supernate decanted from the solid. The solid is suspended in 50 ml. of ethyl acetate and then filtered and washed with ethyl acetate and dried in a desiccator. The product, a solid, (1.0 g.) is soluble in dilute bicarbonate solution. A sample of this material is hydrolyzed in 6 N "ammonia free" hydrochloric acid and the amino acids of the hydrolysate quantitatively measured. The results are tabulated in the table below.

EXAMPLE 2

L-prolylinsulin

A sample (500 mgs.) of the above preparation (t-Boc-L-prolylinsulin) is suspended in 4 ml. of trifluoroacetic acid and allowed to stand for 20 minutes at room temperature during which time solution occurs. The solution is diluted with 50 ml. of anhydrous ether and the insoluble precipitate treated with two 50 ml. portions of anhydrous ether and filtered. The solid is dissolved in 10 ml. of water and filtered to remove any insoluble material. The filtrate (pH 2) is brought to pH 5.5 with diethylamine and allowed to stand at 5° C. overnight. The precipitate is centrifuged off and washed successively with 10 ml. of water and two 10 ml. portions of ethanol and finally with 50 ml. of ethyl acetate and filtered off and dried in vacuum at room temperature. The product (380 mgs.) is soluble in 0.01 N hydrochloric acid and bicarbonate solution. A sample hydrolyzed in 6 N "ammonia free" hydrochloric acid is subjected to quantitative amino acid analysis and the results obtained are tabulated in the table below.

EXAMPLE 3

Di-(t-butyloxycarbonyl-L-prolyl)insulin

Insulin (pork) from Novo Industrie A/S (1.2 g., 200 μmoles is dissolved in 20 ml. of a 1:1 pyridine water mixture, adjusted to pH 8.5 with 0.25 N sodium hydroxide solution, and to this is added a solution of t-butyloxycarbonyl-L-proline p-nitrophenyl ester in pyridine (0.4 g., 1.1 mmoles). The mixture is stirred at room temperature and the pH is maintained at pH 8.5 under pH stat control. The reaction is allowed to run 5 hours during which time six equivalents of base were taken up. The reaction mixture is adjusted to pH 5.5 with 2.5 ml. of 6 N hydrochloric acid and then concentrated in vacuo at room temperature. The residue is washed with 10 ml. of water and the insoluble material filtered off. This is again suspended in 10 ml. of water and filtered. The insoluble product is suspended in 50 ml. of ethanol where the material first forms gum-like clumps which slowly become solid below a colloidal supernatant liquid. The supernate is decanted and the solid residue suspended in 50 ml. of ethyl acetate and filtered and finally washed with this solvent. On drying in a vacuum desiccator, the product weighs 828 mg. From the alcohol supernate an additional 75 mg. are obtained. The product dissolves slowly in 0.01 N hydrochloric acid and readily in dilute bicarbonate. A quantitative amino acid analysis of the hydrolysate of a sample of this product gives the results tabulated in the table below.

EXAMPLE 4

Di-L-prolylinsulin

The above protected di-prolylinsulin (500 mgs.) is suspended in 4 ml. of anhydrous trifluoroacetic acid for 20 minutes during which time solution occurs. The solution is diluted with 50 ml. of anhydrous ether and the precipitate which forms is treated twice with 50 ml. of anhydrous ether. The solid is filtered off and dissolved in 10 ml. of water. The solution is filtered to remove any undissolved material and the filtrate treated with triethylamine to raise the solution to pH 5.5. After standing overnight at 5° C., the precipitate is centrifuged off and washed successively with one 10 ml. portion of water, two 10 ml. portions of ethanol, and finally one 50 ml. portion of ethyl acetate and then filtered and dried in a vacuum desiccator. The product (400 mgs.) is soluble in 0.01 N hydrochloric acid and in dilute bicarbonate solution. The hydrolysate of a sample which is treated with 6 N "ammonia free" hydrochloric acid, for 16 hours, at reflux temperature, is submitted for quantitative amino acid analysis and the results obtained are tabulated in the table below.

TABLE.—AMINO ACID COMPOSITION OF INSULIN DERIVATIVES

| Amino acid | Insulin (pork) | t-Boc-prolyl-* insulin | L-prolyl insulin | di-t-Boc-L-prolyl insulin | di-L-Prolyl insulin |
|---|---|---|---|---|---|
| Aspartic acid | 3 | 3 | 3 | 3 | 3 |
| Threonine | 2 | 2 | 2 | 2 | 2 |
| Serine | 3 | 3 | 3 | 3 | 3 |
| Glutamic acid | 7 | 7 | 7 | 7 | 7 |
| Proline | 1 | 2 | 2 | 3 | 3 |
| Glycine | 4 | 4 | 4 | 4 | 4 |
| Alanine | 2 | 2 | 2 | 2 | 2 |
| Cystine | 3 | 3 | 3 | 3 | 3 |
| Valine | 4 | 4 | 4 | 4 | 4 |
| Isoleucine | 2 | 2 | 2 | 2 | 2 |
| Leucine | 6 | 6 | 6 | 6 | 6 |
| Tyrosine | 4 | 4 | 4 | 4 | 4 |
| Phenylalanine | 3 | 3 | 3 | 3 | 3 |
| Histidine | 2 | 2 | 2 | 2 | 2 |
| Lysine | 1 | 1 | 1 | 1 | 1 |
| Arginine | 1 | 1 | 1 | 1 | 1 |
| Ammonia | 6 | 6 | 6 | 6 | 6 |

*t-Boc=tertiary butyloxycarbonyl.

EXAMPLE 5 t-Butyloxycarbonylglycylinsulin

Insulin (pork) from Novo Industrie A/S (1.2 g., 200 μmoles) is dissolved in 20 ml. of a mixture of equal parts of pyridine and water and to this solution, 180 mgs. (600 μmoles) of t-butyloxycarbonyl-glycine p-nitrophenyl in 2 ml. of pyridine is added. The reaction mixture is stirred at room temperature at constant pH (8.5) until no addition of base (0.25 N NaOH) is required to maintain this pH value. The reaction mixture is then adjusted to pH 5.5 with 6 N hydrochloric acid and concentrated to dryness in vacuo at room temperature. The residue, an oil, is dissolved in 20 ml. of water, the resulting solution adjusted to pH 5.5 and again concentrated to dryness in vacuo at room temperature. The residue is suspended in 50 ml. of ethanol and the colloidal supernate discarded. The solid which remains is suspended in 50 ml. of ethyl acetate and then filtered and washed with ethyl acetate and dried in a desiccator. The product is soluble in dilute bicarbonate solution and can form soluble salts with other cations by careful addition to a pH around 7.

EXAMPLE 6

Glycylinsulin

The above preparation (t-Boc-glycyl-insulin) is suspended in anhydrous trifluoroacetic acid 1 g./10 ml. until solution occurs and allowed to stand for about 20 minutes. The solution is diluted with 100 ml. of anhydrous ether and the precipitate triturated successively with two 100 ml. portions of anhydrous ether and filtered. The solid is dissolved in 25 ml. of water and centrifuged to remove any undissolved material. The supernate is decanted and adjusted to pH 5.5 with triethylamine and allowed to stand overnight at 5° C. The solid which separates is

EXAMPLE 7

Di-(t-butyloxycarbonylglycyl)insulin

Insulin (pork) from Novo Industrie A/S (1.2 g., 200 μmoles) is dissolved in 20 ml. of 1:1 pyridine-water mixture and adjusted to pH 8.5 with 0.25 N sodium hydroxide solution. While maintaining this pH with pH stat control using 0.25 N sodium hydroxide, a pyridine solution of 1200 μmoles of t-butyloxycarbonylglycine p-nitrophenyl ester (360 mgs./2 ml.) is added and the mixture maintained at pH 8.5 until no further addition of base is required. The reaction is complete in 5 hours during which six equivalents of base are consumed. The pH of the reaction mixture is adjusted to 5.5 with 6 N hydrochloric acid and concentrated in vacuo at room temperature. The residue is then washed twice with 10 ml. of water and filtered. The insoluble product is suspended in 50 ml. of ethanol and the solid material which slowly forms is separated from the colloidal supernate by decantation. The solid is suspended in ethyl acetate (50 ml.), filtered, and finally washed with this solvent. The product is dried in a vacuum desiccator. The product is readily soluble in bicarbonate and dissolves slowly in 0.01 N hydrochloric acid.

EXAMPLE 8

Diglycylinsulin

For the preparation of diglycylinsulin, the di(t-Boc-glycyl)insulin described above is dissolved (1 g./10 ml.) in anhydrous trifluoroacetic acid and allowed to stand for about 20 minutes in solution at room temperature. The solution is then diluted with 100 ml. of anhydrous ether and the precipitate triturated twice with 100 ml. of anhydrous ether. The solid is filtered off and dissolved in 20 ml. of water. Any undissolved material is removed by filtration or centrifugation and the clear solution adjusted with triethylamine to pH 5.5. After standing overnight at 5°, the solid which separates is centrifuged off and washed successively with 10 ml. of water, two 10 ml. of ethanol and finally 50 ml. of ethyl acetate and then filtered and dried in a vacuum desiccator. The product is soluble in 0.01 N hydrochloric acid and in dilute bicarbonate solution.

EXAMPLE 9

Crystalline zinc L-prolyl pork insulin 250 mg. of L-prolyl insulin, prepared by the procedure of Example 2, is suspended in 12.5 ml. of water and dissolved by adjusting the pH to 2.3 by the addition of 1 N hydrochloric acid. One gram of sodium chloride and some filter aid (Hyflo) are added to the solution. The precipitate which forms is filtered and washed with 8% sodium chloride solution. The precipitate is dissolved in 25 ml. of distilled water and the pH is adjusted to 7.0 with 1 N sodium hydroxide. Acetone is added to a final concentration of 25%. The solution is filtered to remove a small amount of impurities using Hyflo to facilitate filtration. To the filtered solution 1.2 ml. of citrate buffer of pH 5.4 is added (from 5 g. of citric acid in 10 ml. of water and 2.5 g. of sodium hydroxide in 5 ml. of water diluted to 30 ml. with water). Finally 0.25 ml. of 20% zinc chloride solution is added and the pH is adjusted to 6. The walls of the flask are scratched and the mixture is kept at room temperature until a significant part of the modified insulin appears in crystalline form. Several days in the refrigerator (5°) render the crystallization complete. The crystals of zinc L-prolylinsulin are then filtered and washed with dilute acetone, finally with acetone and air dried.

EXAMPLE 10

Zinc glycylinsulin

Following the procedure of Example 9, but substituting an equivalent amount of glycylinsulin, prepared by the procedure of Example 6, for the L-prolylinsulin, crystalline zinc glycylinsulin is obtained.

EXAMPLE 11

Zinc L-prolylinsulin solution for injection

To prepare 170 liters of a sterile solution of zinc L-prolylinsulin containing 80 units of the insulin per ml., the following procedure is followed:

125 kg. of water for injection is introduced into a batching tank. 2720 g. of glycerin, 170 cc. of redistilled phenol (100%) and 170 cc. of 1 N hydrochloric acid solution are added and the solution is mixed well. 600 g. of zinc L-prolylinsulin is suspended in approximately 9 liters of water for injection. The mixture is stirred and sufficient 1 N hydrochloric acid is added to dissolve the solids and adjust the pH to 2.6 to 2.8. The resulting insulin solution is then added to the batching tank and mixed thoroughly. Sufficient water for injection is added to bring the total solution weight to approximately 165 kg. The pH is adjusted to 2.6 to 2.8 with 1 N hydrochloric acid and sufficient water for injection is added to bring the final solution to 170 liters. The solution is sterilized by filtration under pressure through stainless steel filter paper and filled under sterile conditions into 10 cc. glass vials.

EXAMPLE 12

Zinc glycylinsulin solution for injection

Following the procedure of Example 11, but substituting an equivalent amount of zinc glycylinsulin for the zinc L-prolylinsulin, a zinc glycylinsulin solution for injection is obtained.

EXAMPLE 13

Protamine zinc L-prolylinsulin

To prepare 1000 liters of protamine zinc L-prolylinsulin, the following procedure is used:

(a) 450 kg. of water for injection is introduced into a batching tank. 8,000 g. of glycerin, 500 cc. of redistilled phenol (100%) and 500 cc. of 1 N hydrochloric acid solution are added. 850 cc. of zinc chloride solution (200 mg. of zinc per cc.) are then added and the solution is mixed well. 3400 g. of zinc L-prolylinsulin and 1000 g. of protamine sulfate are added and the resulting mixture is stirred. Sufficient 1 N hydrochloric acid is added to bring the pH to 2.9–3.0 and to dissolve the solids. Sufficient water for injection is then added to bring the final solution to 500 liters and the solution is sterilized by filtration under pressure and the protamine zinc L-prolylinsulin is collected in 20 liter bottles for the filling operation.

(b) 500 kg. of water for injection is introduced into a batching tank. 2,200 g. of sodium phosphate dibasic, anhydrous, 8,800 g. of glycerin and 2,200 cc. of redistilled phenol (100%) are added and the resulting solution is mixed. Sufficient water for injection is then added to bring the total solution to 550 liters and the solution is mixed. The pH of the resulting buffer solution is adjusted so that when mixed with an equal volume of the protamine zinc L-prolylinsulin solution, a pH of 2.9–3.0 is obtained. This is done by adding either 1 N hydrochloric acid or 1 N sodium hydroxide. The buffer solution is sterilized by filtration under pressure and collected in 20 liter bottles.

(c) Using appropriate apparatus 10 cc. vials are filled with 5 cc. of the sterile protamine zinc L-prolylinsulin solution.

EXAMPLE 14

NPH L-prolylinsulin

To prepare 500 liters of NPH L-prolylinsulin, the following procedure is followed:

(a) 200 liters of water for injection is introduced into a batching tank, 4,000 g. of glycerin, 375 g. of freshly distilled meta-cresol, 162.5 cc. of redistilled phenol (100%) and 250 cc. of 1 N hydrochloric acid are added and the resulting solution is mixed. 30 cc. of zinc chloride solution (200 mg. of zinc per cc.) are added and the resulting mixture is mixed thoroughly. 1,700 g. of zinc L-prolylinsulin and 168 g. of protamine sulfate are added and the resulting mixture is stirred. Sufficient 1 N hydrochloric acid is added to bring the pH to 2.7 to 3.0 and to dissolve all the solids. Sufficient water for injection is then added to bring the solution to a weight of 245 kg. and the pH is adjusted to 2.7 to 3.0 with 1 N hydrochloric acid. Sufficient water for injection to bring the final solution to 250 liters is then added and the solution is thoroughly mixed. The solution is sterilized by filtration under pressure.

(b) 200 liters of water for injection is introduced into a batching tank. 1,400 g. of sodium phosphate dibasic, anhydrous, 5,600 g. of glycerin, 525 g. of freshly distilled meta-cresol and 227.5 cc. of redistilled phenol (100%) are added and the resulting solution is mixed. Sufficient water for injection to bring the solution to a weight of 250 kg. is added and the solution is mixed. The pH of the buffer solution is adjusted so that when mixed with an equal amount of the solution prepared in step (a), a pH of 2.7 to 3.0 is attained. 1 N hydrochloric acid or 1 N sodium hydroxide is used for this purpose. The solution is then sterilized by filtration under pressure.

(c) Using the proper apparatus, 10 cc. vials are filled with 5 cc. of the sterile buffer solution obtained in step (b), and 5 cc. of the sterile L-prolylinsulin-protamine-zinc solution obtained in step (a).

EXAMPLE 15

Long acting zinc L-prolylinsulin preparation

A solution of 1% zinc L-prolylinsulin, 0.05 M sodium citrate, 470 mcg. of zinc ion (from zinc chloride) per cc., and 7% sodium chloride, having a pH of 6.0–6.1, is prepared. From this solution long acting zinc L-prolylinsulin crystals are obtained by sterile crystallization.

For more prompt response the long acting insulin crystals prepared as described above can be combined with varying combinations of sterile amorphous zinc L-prolylinsulin containing 2 mcg. of zinc per unit. Such combination gives both a prompt response and a prolonged action. The sterile amorphous zinc L-prolylinsulin is prepared by adding to a sterile solution of 1% insulin, 470 mcg. of zinc ion (from zinc chloride) per cc. and adjusting the pH to 7.0 with 1 N sodium hydroxide. The amorphous insulin is precipitated and collected sterilily.

What is claimed is:

1. A polypeptide selected from the group consisting of L-prolylinsulin, di-L-prolylinsulin, glycylinsulin, diglycylinsulin, and the t-butyloxycarbonyl-protected forms thereof wherein the prolyl and glycyl groups are present in the N-terminal positions of the insulin molecule.

2. A compound according to claim 1 having the name L-prolylinsulin.

3. A compound according to claim 1 having the name di-L-prolylinsulin.

4. A compound according to claim 1 having the name t-butyloxycarbonyl-L-prolylinsulin.

5. A compound according to claim 1 having the name di-(t-butyloxycarbonyl-L-prolyl)insulin.

6. A compound according to claim 1 having the name glycylinsulin.

7. A compound according to claim 1 having the name diglycylinsulin.

8. A compound according to claim 1 having the name t-butyloxycarbonylglycylinsulin.

9. A compound according to claim 1 having the name di-(t-butyloxycarbonylglycyl)insulin.

10. A complex of (a) a member of the group consisting of protamine, histone, globin, zinc, zinc protamine, zinc histone, and zinc globin and (b) a member of the group consisting of L-prolylinsulin, di-L-prolylinsulin, glycylinsulin, and diglycylinsulin wherein the L-prolyl and glycyl groups are present in the N-terminal positions of the insulin molecule.

References Cited

UNITED STATES PATENTS

| | | | |
|---|---|---|---|
| 2,787,575 | 4/1957 | Homan et al. | 167—75 |
| 3,062,804 | 11/1962 | Albertson | 260—112.5 |

FOREIGN PATENTS 614,990  12/1948  Great Britain.

OTHER REFERENCES

Camain-Giabicani et al.: Compte Rendus Soc. Biologie (Paris), 158, 790–793 (1964).

Freudenberg et al.: cited in Chem. Abst. 22, 2206–2207 (1928).

Hartley et al.: Biochem. J. 56, 288–291 and 295–297 (1954).

Stracher et al.: Biochem. Biophys. Acta 20, 595–596 (1956).

Stracher et al.: J. Am. Chem. Soc. 81, 1432–1435 (1959).

Fraenkel-Conrat et al.: Biochem. Biophys. Acta 5, 89–97 (1950).

Tietze et al.: Biochem. Biophys. Acta 59, 336, 345 and 346 (1962).

Levy et al.: Biochem. (Wash.) 6, 3559–3568 (1967).

LEWIS GOTTS, Primary Examiner

M. KASSENOFF, Assistant Examiner

U.S. Cl. X.R.

260—112, 113; 424—177, 178